United States Patent
Karbacher et al.

(10) Patent No.: US 10,920,627 B2
(45) Date of Patent: Feb. 16, 2021

(54) ADJUSTING UNIT OF AN INTERNAL COMBUSTION ENGINE

(71) Applicant: Schaeffler Technologies AG & Co. KG, Herzogenaurach (DE)

(72) Inventors: Christian Karbacher, Herzogenaurach (DE); Peter Solfrank, Frensdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 18 days.

(21) Appl. No.: 16/321,843

(22) PCT Filed: Sep. 15, 2017

(86) PCT No.: PCT/DE2017/100786
§ 371 (c)(1),
(2) Date: Jan. 30, 2019

(87) PCT Pub. No.: WO2018/054423
PCT Pub. Date: Mar. 29, 2018

(65) Prior Publication Data
US 2020/0200054 A1    Jun. 25, 2020

(30) Foreign Application Priority Data

Sep. 22, 2016  (DE) .................. 10 2016 218 193
Sep. 22, 2016  (EP) ..................................... 16190025

(51) Int. Cl.
*F01L 1/34*      (2006.01)
*F01L 1/352*    (2006.01)
(Continued)

(52) U.S. Cl.
CPC .............. *F01L 1/352* (2013.01); *F01L 1/047* (2013.01); *F01L 13/08* (2013.01); *H02P 6/181* (2013.01);
(Continued)

(58) Field of Classification Search
CPC . F01L 1/352; F01L 1/047; F01L 13/08; F01L 2013/111; F01L 2013/113;
(Continued)

(56) References Cited

U.S. PATENT DOCUMENTS 8,677,963 B2 *  3/2014  Stoltz-Douchet ....... F01L 1/344
                                                                    123/90.11
9,374,028 B2 *  6/2016  Nondahl .................. H02P 6/181
(Continued)

FOREIGN PATENT DOCUMENTS

CN     101263281 A    9/2008
CN     101548068 A    9/2009
(Continued)

OTHER PUBLICATIONS

M. Schrödl, E. Robeischl: Sensorlose Drehzahl—und Lageregelung von Permanentmagnet-Synchronmaschinen aut Basis des INFORM-method (Sensorless Revolution Rate and Position Control of Permanent Magnet Synchronous Machines Based on the INFORM Method); e&i Elektrotechnik and Informationstechnik, Feb. 2000, vol. 117, Issue 2, pp. 103-112 (published online by Springer Link).

*Primary Examiner* — Zelalem Eshete
(74) *Attorney, Agent, or Firm* — Matthew Evans

(57) ABSTRACT

An adjusting unit of an internal combustion engine is provided, comprising an electric motor and a transmission interacting therewith, an adjusting shaft of the transmission being coupled to the rotor of the electric motor. A drive shafts of the transmission is coupled to the shaft which is to be adjusted. For controlling the electric motor, a sensorless control unit is provided outside of a housing of the electric motor which encloses the stator of the electric motor.

18 Claims, 3 Drawing Sheets

(51) Int. Cl.
  *F01L 1/047* (2006.01)
  *F01L 13/08* (2006.01)
  *H02P 6/18* (2016.01)
  *F01L 13/00* (2006.01)
(52) U.S. Cl.
  CPC .... *F01L 2013/111* (2013.01); *F01L 2013/113* (2013.01); *F01L 2820/032* (2013.01); *F01L 2820/041* (2013.01); *F01L 2820/042* (2013.01)
(58) Field of Classification Search
  CPC ........... F01L 2820/032; F01L 2820/041; F01L 2820/042; H02P 6/181
  See application file for complete search history.

(56) References Cited

U.S. PATENT DOCUMENTS

| | | | |
|---|---|---|---|
| 2007/0101956 | A1 | 5/2007 | Schafer et al. |
| 2012/0085302 | A1* | 4/2012 | Cleeves ................. F02D 15/00 123/55.2 |
| 2015/0022129 | A1 | 1/2015 | Lu et al. |

FOREIGN PATENT DOCUMENTS

| | | |
|---|---|---|
| CN | 103032124 A | 4/2013 |
| CN | 105339608 A | 2/2016 |
| CN | 106460587 A | 2/2017 |
| DE | 100 63 054 A1 | 6/2002 |
| DE | 10259133 A1 | 7/2004 |
| DE | 10 2005 002 327 A1 | 8/2005 |
| DE | 10 2004 09 128 A1 | 9/2005 |
| DE | 10 2005 022 201 B3 | 6/2006 |
| DE | 10 2008 058 955 A1 | 6/2009 |
| DE | 10 2011 083 800 A1 | 4/2013 |
| DE | 10 2012 223 847 A1 | 6/2014 |
| DE | 10 2013 218 041 A1 | 3/2015 |
| DE | 10 2013 220 220 A1 | 4/2015 |
| EP | 2 057 363 B1 | 5/2009 |
| WO | 2014/030 043 A1 | 2/2014 |
| WO | 2015/200085 A1 | 12/2015 |

* cited by examiner

ADJUSTING UNIT OF AN INTERNAL COMBUSTION ENGINE

CROSS-REFERENCE TO RELATED APPLICATIONS

This application is the U.S. National Phase of PCT Application No. PCT/DE2017/100786 filed Sep. 15, 2017 which claims priority to DE 102016218192.0 filed Sep. 22, 2016.

TECHNICAL FIELD

This disclosure concerns an adjusting unit suitable for use in a combustion engine, in particular a camshaft adjuster or a device for varying the compression ratio. The adjusting unit comprises an electric motor and a transmission that interacts therewith, wherein the transmission comprises an adjusting shaft coupled to the rotor of the electric motor and an output shaft provided for coupling to a combustion engine shaft.

BACKGROUND

Such adjusting units are known as camshaft adjusters for example from DE 10 2004 009 128 A1, DE 10 2011 083 800 A1 and from DE 10 2013 220 220 A1. Said camshaft adjusters each work with a harmonic drive transmission as the adjusting gear.

A further camshaft adjuster is known from US 2007/0101956 A1. In this case, it is an electromechanical camshaft adjuster with a BLDC motor, i.e. with an electronically commutating motor. In this case, commutation signals are used at the same time to determine the rotation angular position of the camshaft. Further electrical camshaft adjusters arise from DE 10 2005 022 201 B3, EP 2 057 363 B1 and WO 2014/030043 A1.

A camshaft adjuster that obtains the commutation signals with a BEMF method is revealed in WO2015/200 085 A1. Whereas the BEMF method provides reliable signals at high BLDC motor speeds, these are unreliable in the low revolution rate range.

For electric motors it is also known to use different methods to obtain the commutation signals. US 2015/0022129 A1 thus proposes to analyze PWM signals below a revolution rate threshold and to use BEMF above said threshold. At low revolution rates, the position of the rotor is determined thereby by analyzing the PWM-synchronous voltage profiles in the individual coils and in doing so determining how far the rotor lags a controlled rotating field using the inductance. Advantageously, a current sensor is unnecessary, and the motor can be actuated under full load.

The method is not suitable for use in an adjusting unit of an internal combustion engine, because it is used only for safe acceleration to operation in the BEMF method. If the electric motor is once operated with the BEMF method, the motor must run down to a standstill in order to be able to access the method again at low revolution rate. The method is thus unsuitable for an application scenario such as with the adjustment of the camshaft angle or varying the compression ratio of a combustion engine, since in that case a smooth transition is essential in both operating modes. Furthermore, such an electric motor requires a star point circuit; the method cannot be used for motors in a triangular circuit.

SUMMARY

It is the object of this disclosure to further develop an adjusting unit of an internal combustion engine compared to the mentioned prior art in respect of a particularly compact, easily assembled design that is fit for purpose. Furthermore, it is the object of the disclosure to specify a working method for such an adjusting unit.

This object is achieved according to the disclosure by an adjusting unit with the features described herein and by a method for operating the adjusting unit also described herein. The embodiments and advantages of the disclosure described below in connection with the operating method also apply similarly to the device and vice-versa.

The adjusting unit comprising an electric motor and a transmission operated by said motor in a known basic design also comprises an actuating unit, which is embodied for sensorless actuation of the electric motor. The actuating unit is not necessarily a single structural unit. The term "sensorless" refers in the present context to detecting the rotor position of the electric motor. By eliminating any sensor that detects the rotor position and/or rotation of the rotor of the electric motor, geometric limitations that would arise from the presence of a sensor or a plurality of sensors are eliminated.

The actuating unit of the adjusting unit can be disposed outside a not necessarily closed housing of the electric motor enclosing the stator of the electric motor. In addition, a component that has the task of holding stator elements of the electric motor is in this sense to be considered as the housing of the electric motor. The arrangement of the actuating unit outside the mentioned housing has advantages both in respect of the use of space and in respect of the thermal load and cooling of components. Optionally, the stator and the rotor of the electric motor and the actuating unit are enclosed by a further common outer housing. Owing to the sensorless actuation of the electric motor, there is a great deal of design freedom in respect of the shape of such an outer housing.

Regarding the sensorless, i.e. electronic, commutation of an electric motor, by way of example attention is drawn to the documents DE 10 2005 002 327 A1, DE 10 2008 058 955 A1 and DE 100 63 054 A1.

In a design that is particularly advantageous in respect of the heat dissipation, the central axis of the electric motor of the adjusting unit is offset relative to the actuating unit, wherein the actuating unit is mechanically connected to the electric motor by means of a mounting plate forming a cooling surface. In this context, a component that is not completely flat and that makes a mechanical connection between the electric motor and the actuating unit is effective as the mounting plate.

The actuating unit comprises no position sensing arrangement, but, in an example embodiment, voltage sensors and current sensors are used when operating the actuating unit in two different operating modes.

The operating modes can be selected depending on the revolution rate in relation to the revolution rate of the electric motor. In the case of the operating mode in a lower revolution rate range, it is a current pulse-based mode and in the case of the operating mode in an upper revolution rate range it is a counter voltage-based mode. The latter mode is also referred to as a BEMF mode (back electro-magnetic force).

The pulse-based method can be used as follows when the electric motor is at a standstill: short current pulses (for example with a duration of less than one ms in each case) are sent that do not move the rotor of the electric motor, but that are influenced by the magnetic field of the rotor. The influence is a function of the angle, so that the angular position of the rotor can already be concluded when the motor is at a standstill by means of the response signal.

Thus, even in the pulse-based actuation mode of the electric motor defined by the lower revolution rate range and when the electric motor is at a standstill, there is no "blind" operation of the electric motor and thus no comparability with the operating mode of a stepper motor. Compared to a PWM method, the efficiency is slightly lower, because in addition the test pulses may be introduced. For this purpose, the proposed method also enables a safe transition back from the BEMF method without the electric motor having to be re-started.

In principle, the actuation of an electric motor with a pulse-based method in the lower revolution rate range and when the electric motor is at a standstill and with a method that uses an induced electromagnetic force in the upper revolution rate range for example, is described in the following publication:

M. Schrödl, E. Robeischl: Sensorlose Drehzahl- and Lageregelung von Permanentmagnet-Synchronmaschinen auf Basis des INFORM-method (Sensorless Revolution Rate and Position Control of Permanent Magnet Synchronous Machines Based on the INFORM Method); e&i Elektrotechnik and Informationstechnik, February 2000, Volume 117, Issue 2, pp 103-112 (published online by Springer Link).

The abbreviation INFORM stands for INdirect Flux determination by Online Reactance Measurement.

For the technical background, attention is also drawn in this context to the documents DE 10 2013 218 041 A1 and DE 10 2012 223 847 A1. Where the actuating unit processes signals from sensors providing angle information, the corresponding sensors are not to be assigned to the camshaft adjuster. The mentioned angle information, i.e. information relating to the angular position and/or rotation, can be assigned to the camshaft in a first case and to the crankshaft in the other case. The sensors provided for detecting the angle information can be disposed on the side of the camshaft or the crankshaft that faces away from the camshaft adjuster and the transmission, in particular the continuously variable transmission, which transfers a torque from the crankshaft to the camshaft.

The electric motor of the adjusting unit is a three-phase electronically commutated motor, for example. The electric motor can also be a synchronous reluctance motor.

The transmission of the adjusting unit can be embodied as a three-shaft transmission, in particular as a harmonic drive transmission. The output shaft of said transmission can be a transmission part that is fixed to the housing, so that the housing of the transmission, which is not necessarily closed, rotates as a whole when the adjusting unit is operating.

With an adjusting unit embodied as a camshaft adjuster, for example, the following operating method can be implemented:

With the combustion engine at a standstill, the angular relationship between the stator and the rotor of the electric motor is determined by energizing the stator with current pulses, i.e. test pulses, and analyzing the response signals, the angular position of the rotor of the electric motor is detected up to a revolution rate limit thereof based on current pulses, the commutation of the electric motor is converted to a counter voltage-based mode (BEMF mode) when the revolution rate limit is exceeded.

In a known basic design, the camshaft adjuster comprises an electric motor and an adjusting gear that is actuated by said electric motor. The adjusting gear comprises an input shaft, an output shaft and an adjusting shaft. In this case, the input shaft is driven by the crankshaft of a combustion engine, for example by means of a chain drive or belt drive or by means of a toothed wheel transmission. The output shaft of the adjusting gear is rotationally fixedly connected to or identical with the camshaft of the combustion engine. The adjusting shaft of the adjusting gear is coupled to the rotor of the electric motor, wherein optionally a further transmission is connected between the electric motor and the adjusting shaft of the adjusting gear. In any case, the electric motor is a sensorless electronically commutating electric motor, wherein the term "sensorless" is related to an angle sensing arrangement. This means that neither an absolute nor an incremental angle sensing arrangement of the electric motor is provided. The actuation of the electric motor is carried out in each operating state of the camshaft adjuster in one of two actuating modes, each of which enables controlled operation of the electric motor. In this case, a first actuation mode is effective from the standstill of the electric motor up to a not necessarily fixed revolution rate limit, whereas a second actuation mode is activated at revolution rates from the revolution rate limit. To carry out the different actuating modes and for switching between the first and the second actuation modes, the camshaft adjuster comprises the actuating unit, which is not necessarily a single structural unit. The actuating unit can be integrated within the electric motor or it can be spatially separated from the electric motor.

In the case of an adjusting unit embodied as a device for adjustment of the compression ratio, there are two operating ranges of special interest: a first range, in which the compression ratio is held constant, and a second range, in which a very fast change is carried out. In the first range, in which as a rule the internal combustion engine is operated for the greatest time, energizing with test pulses results in high accuracy. In the second range, the electric motor operates rotating rapidly in the BEMF mode.

Other conceivable applications of the adjusting unit and the proposed method are for example electrical chain tensioners or electrical belt tensioners.

It is common to applications as an adjusting unit for internal combustion engines that the electric motor is continually operated alternately both with revolution rates close to the maximum revolution rate thereof and in phases of no adjustment to keep a constant angle, and then with as low a revolution rate as possible to keep the thermal input low. The correct commutation must however be ensured over the entire revolution rate band, especially when running up.

According to a development of the method, the changeover between the two actuating modes is carried out depending on both the revolution rate of the electric motor and the revolution rate of the crankshaft of the combustion engine. Likewise, revolution rate changes of the combustion engine, in particular the rate of revolution rate changes, have an effect on the changeover between the different actuating modes of the electric motor. Thus for example, a particularly early changeover between the first actuation mode and the second actuation mode can be provided in the case of a rapid run-up of the combustion engine.

In each actuation mode the actuation of the electric motor is carried out depending on the angular position of the rotor thereof. Thus, even in the pulse-based actuation mode of the electric motor existing in the lower revolution rate range and when the electric motor is at a standstill, there is no "blind" operation of the electric motor and hence no comparability with the operating mode of a stepper motor.

The revolution rate limit described for the camshaft adjuster, but also provided for other types of adjusting unit, is variable with advantageous process management. In particular, a hysteresis can be produced in different directions during the changeover between the pulse-based method and the BEMF mode.

The advantage of the disclosure is in particular that design freedoms are gained from the sensorless commutation of a brushless DC motor of the adjusting unit, which concerns the arrangement of the power electronics of the electric motor in the internal combustion engine. Thus, thermally optimized accommodation of the power electronics is achieved at the same time as a compact design.

A harmonic drive transmission, i.e. a transmission with a flexible toothed component, or a three-shaft transmission of another design type, for example a planetary gear, an inner eccentric gear or a swash plate gear, is used as the adjusting gear within the adjusting unit, for example.

The electric motor can be embodied as an internal rotor motor. In principle, the electric motor can also be a motor of an external rotor design.

BRIEF DESCRIPTION OF THE DRAWINGS

The disclosure will be described in detail below using drawings in the embodiment as a camshaft adjuster. In the drawings.

DETAILED DESCRIPTION

Figure 1:
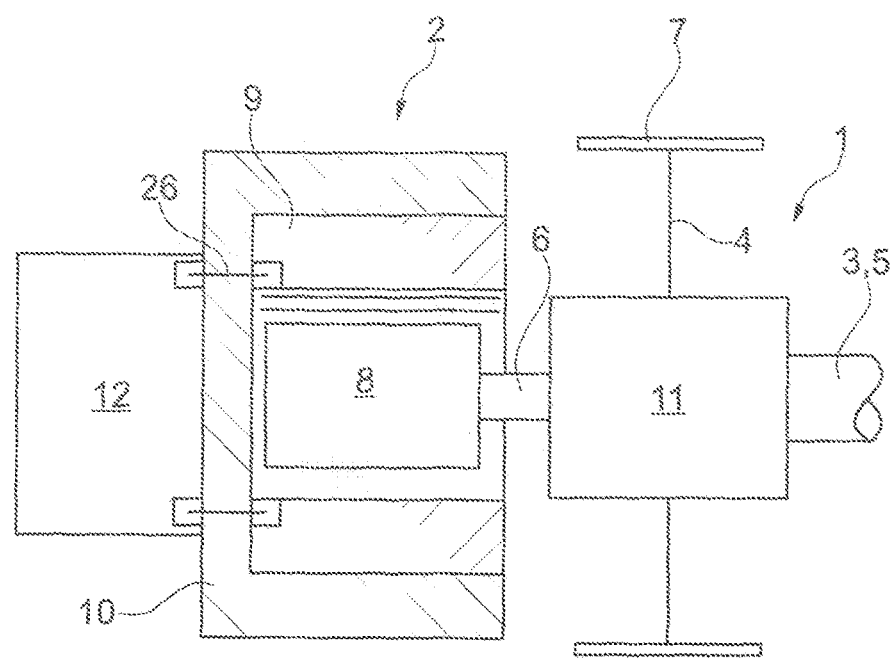
FIG. 1 shows a first electrical camshaft adjuster in a schematic view.
Figure 2:
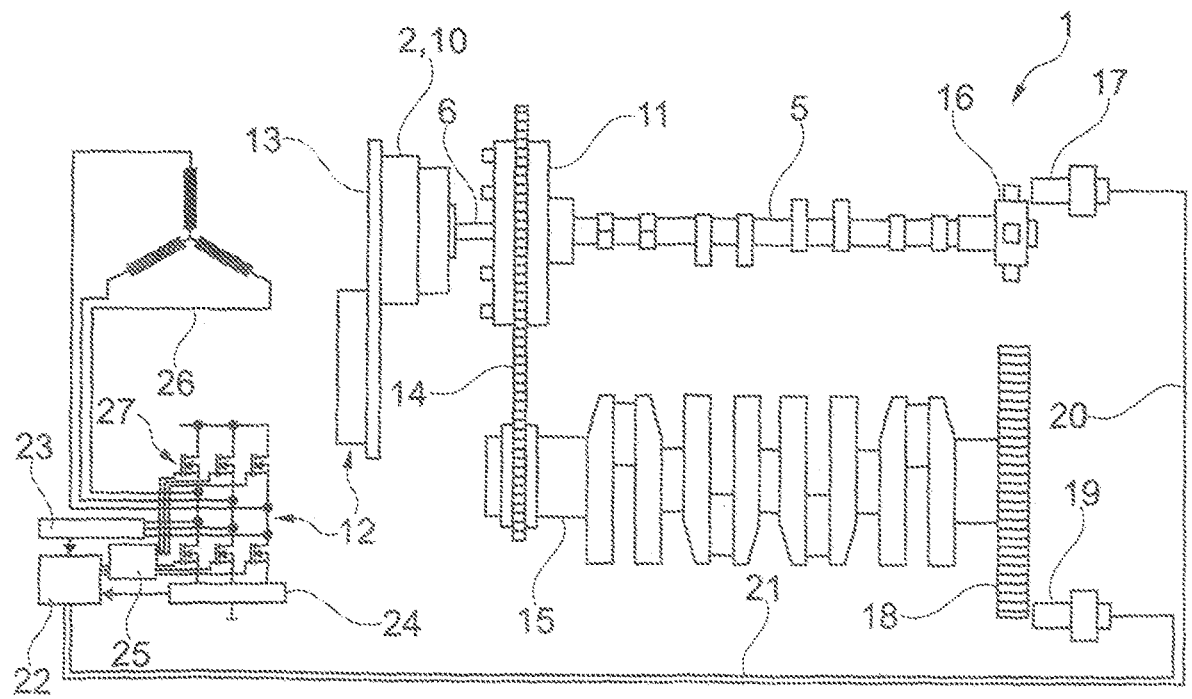
FIG. 2 shows details of the camshaft adjuster according to FIG. 1 and components of a combustion engine that interact with said camshaft adjuster.

An adjusting unit characterized in total by the reference character 1 is provided in FIG. 1 as an electrical camshaft adjuster for installation in an internal combustion engine represented in a basic manner in FIG. 2. Regarding the basic function of the camshaft adjuster, attention is drawn to the prior art cited above.

The camshaft adjuster comprises an electric motor 2, the housing thereof is designated by 10 and the stator thereof is designated by 9. The rotor of the electric motor 2 designated by 8 is coupled to a transmission 11 by means of an adjusting shaft 6. The transmission 11 is a three-shaft transmission, namely a harmonic drive transmission. The adjusting shaft 6 can be identical to or rotationally fixedly coupled to the motor shaft of the electric motor 2. In the latter case, a compensation coupling, in particular an Oldham coupling, can be connected between the transmission 11 and the electric motor 2.

On the output side of the transmission 11, an output shaft 3 is identical to or fixedly connected to a shaft 5 of the internal combustion engine. In this application, the shaft 5 is the camshaft. An output shaft of the transmission 11 is denoted by 4 and is fixedly connected to a drive wheel 7, namely a belt disk or a chainwheel. As a whole, the output shaft 4 is fixed to the housing part of the transmission 11. The output shaft 4 is driven by the drive shaft, which is denoted by 15, of the internal combustion engine, i.e. the reciprocating piston engine, namely a four cylinder inline engine, by means of a traction means 14 that can be seen in FIG. 2. The drive shaft is the crankshaft in the present case. The camshaft adjuster can be used in combustion engines of another design as well.

If the adjusting shaft 6 is rotating at the revolution rate of the camshaft, i.e. at half the revolution rate of the crankshaft, the phase relationship between the camshaft and the crankshaft is not changed. Only in the event of a revolution rate difference between the camshaft and the adjusting shaft 6 does the transmission 11, as a reduction adjusting gear, bring about an adjustment of the phase relationship between the camshaft and the crankshaft.

The electric motor 2 is operated using an actuating unit 12 that is flanged to the electric motor 2 in an off-center manner. In this case, a mounting plate 13 connects the housing 10 of the electric motor 2 to the actuating unit 12. Electronic components of the actuating unit 12 sketched in FIG. 2 are actually disposed in the housing of the actuating unit 12 on the mounting plate 13—which is different from the schematic representation. The mounting plate 13 not only makes the mechanical connection between the electric motor 2 and the actuating unit 12, but also acts as a heat conducting and cooling surface at the same time. The asymmetric arrangement of the actuating unit 12 relative to the electric motor 2 results in good heat dissipation from the electric motor 2, associated with a low thermal load on the actuating unit 12.

The camshaft adjuster is disposed together with the traction means 14 on a first end face of the camshaft and the crankshaft. On the opposite end faces of the camshaft and the crankshaft are disposed different sensors 17, 19, each providing angle information. In this case it is a sensor 17 that interacts with a sensor wheel 16 that is fixedly connected to the camshaft, and a sensor 19 that senses a sensor wheel 18 that is fixedly connected to the crankshaft and that acts as a flywheel at the same time.

Signals provided by the sensors 17, 19 are fed by means of signal lines 20, 21 to a microcontroller 22 that is assigned to the actuating unit 12. Furthermore, voltage sensors 23, current sensors 24 and a driver 25 are assigned to the actuating unit 12. A power electronics circuit, which is denoted as a whole by 27, of the actuating unit 12 supplies electrical energy via lines 26 to coils of the stator 9, wherein three star-shaped connected impedances can be seen in FIG. 2. Alternatively, a triangular circuit can be produced in a way that is not shown.

The actuating unit 12 already enables adjustment of the camshaft when the combustion engine is at a standstill. In this case, first a pulse-based method is used, in particular in the context of the method known as the INFORM method. At higher revolution rates, an automatic changeover of the actuation of the electric motor 2 implemented by the actuating unit 12 is carried out to the BEMF method, which is based on analyzing an induced electromotive force in windings of the stator 9 of the electric motor 2.

The electromechanical camshaft adjuster generally has the advantage compared to a hydraulic camshaft adjuster that adjustment of the camshaft is already possible when the combustion engine is at a standstill. In the present case, the changeover between the first actuation mode and the second actuation mode of the electric motor can also already be carried out when the crankshaft is at a standstill. In one embodiment, switching from the first actuation mode to the second actuation mode takes place at a revolution rate of the electric motor of at least 3% and no more than 20% of the rated revolution rate of the electric motor.

Figure 3:
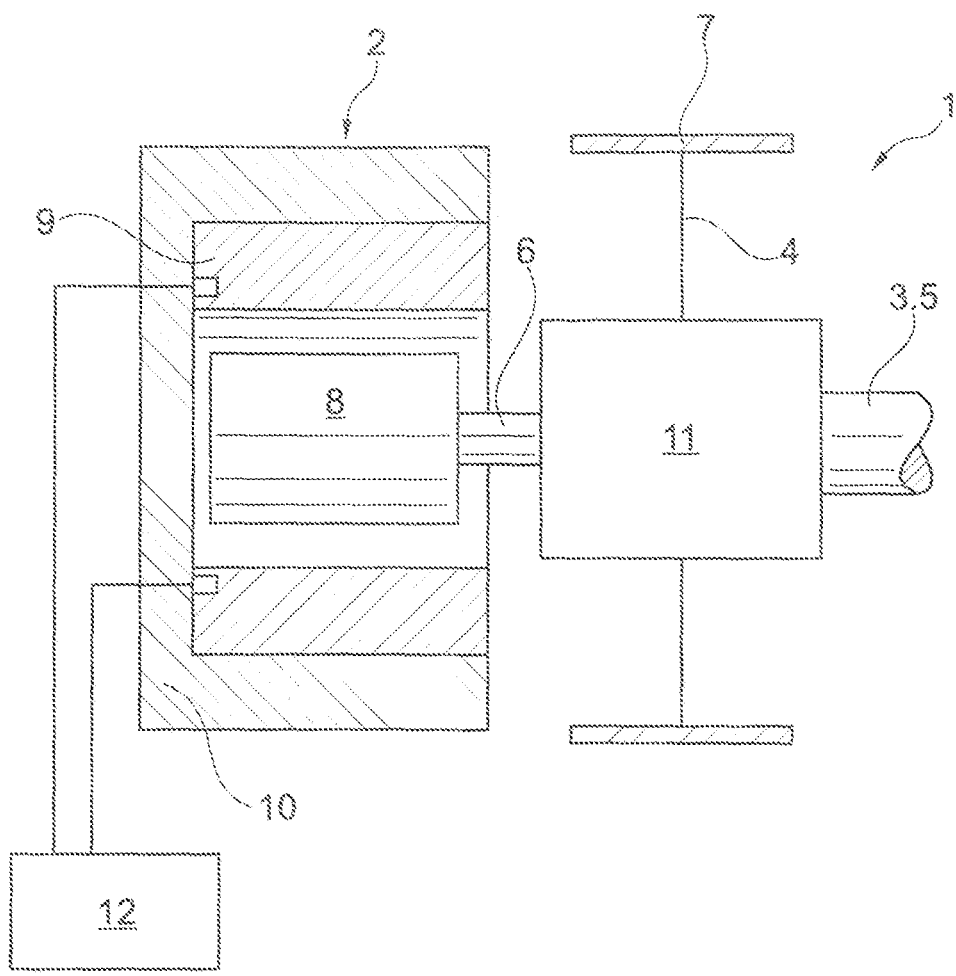
FIG. 3 shows a second electromechanical camshaft adjuster in a rough schematic representation.

FIG. 3 shows a further adjusting unit 1 as an electrical camshaft adjuster with an electric motor 2, namely a sensorless BLDC motor, and that is used for the phase adjustment of a camshaft 5, which is only shown in a basic manner, of a combustion engine, namely a reciprocating piston engine, in relation to the crankshaft, which is not shown, of the combustion engine.

An actuating gear of the camshaft adjuster 1 that is characterized by the reference character 11 is a harmonic drive transmission. An input shaft 4 of the adjusting gear 11 that is fixed relative to the housing is connected to a drive wheel 7, which is driven by the crankshaft by means of a chain drive or belt drive. The output shaft, which is denoted by 3, of the adjusting gear 11 is identical to or rotationally fixedly connected to the camshaft 5.

An adjusting shaft 6 of the adjusting gear 11 is coupled to a rotor 8 of the electric motor 2 either directly—as sketched in FIG. 1—or via an intermediate compensation coupling, namely an Oldham coupling. Stator windings are denoted by 9 and the housing of the electric motor is denoted by 2. In total, the electric motor 2 is a motor that is stimulated by a permanent magnet. The actuation thereof is carried out using an actuating unit 12.

The actuating unit 12 is embodied to operate the electric motor 2 in two different actuating modes, as described in detail below using FIG. 4.

Figure 4:
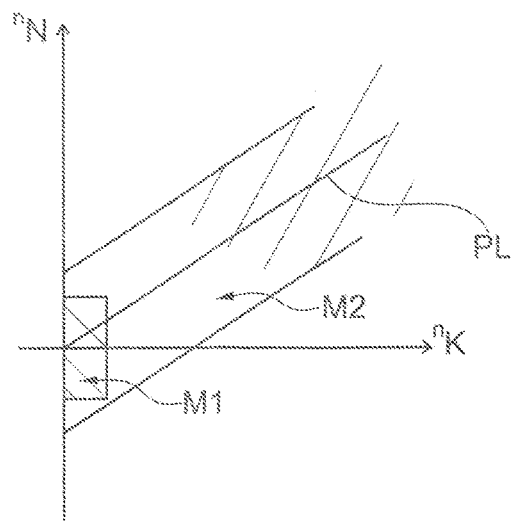
FIG. 4 shows in a diagram different operating modes of the camshaft adjuster according to FIG. 3

In FIG. 4, different actuating modes of the electric motor 2 are illustrated depending on the revolution rate of the crankshaft (nK) of the combustion engine and on the revolution rate of the camshaft (nN) and the revolution rate of the electric motor 2. If no phase adjustment of the camshaft is carried out in relation to the crankshaft, then there is a proportional relationship between the revolution rate of the camshaft and the revolution rate of the crankshaft. In the diagram according to FIG. 4, said relationship is visually represented by the proportionality line PL. In this case, the revolution rate $n_N$ of the camshaft coincides with the revolution rate of the rotor 8. Once the revolution rate of the adjusting shaft 6, i.e. the revolution rate of the rotor of the electric motor 2, deviates from the revolution rate of the input shaft 4, the phase of the camshaft is adjusted relative to the crankshaft.

Regardless of whether the camshaft is rotated or adjusted with a constant phase relationship to the crankshaft, the electric motor 2 is operated with the BEMF method in most of the possible revolution rate band of the combustion engine. This corresponds to the second actuation mode, denoted in FIG. 4 by M2.

The camshaft can already be adjusted by means of the camshaft adjuster 1 when the combustion engine is at a standstill, and at a low revolution rate of the crankshaft, in particular during the combustion engine starting process. In this case, the electric motor 2 is operated in a first, pulse-based actuation mode. In said first actuation mode, denoted in FIG. 4 by M1, stator windings 9 are subjected to very short voltage pulses, in the extreme case these being only a few microseconds long, using the actuating unit 12. As the impedances are a function of the angular position of the rotor 8, the angular position of the rotor 8 can be derived from a reverse measurement of the phase current that is also carried out by means of the actuating unit 12. In this way, the electric motor 2 is already operated under control from when the rotor 8 is at a standstill. As FIG. 4 further shows, a transition between the first, pulse-based operating mode of the electric motor 2 and the second actuation mode, i.e. with the BEMF method, can already be carried out while the crankshaft is at a standstill. Likewise, a changeover between the two actuating modes is possible after the rotation of the crankshaft has started. At the idling revolution rate of the combustion engine and higher revolution rates, only the BEMF method is used.

The lack of any sensor arrangements, for example in the form of Hall sensors, resolvers or encoders results in a particularly compact and robust design of the electric motor 2 and the entire camshaft adjuster 1. Likewise there is no need to consider the temperature sensitivity of any angle sensing arrangement. The information about the angular position of the rotor 8 that is still available in any operating state can be used not only for actuation of the electric motor 2, but also provides information about the phase of the camshaft.

Figure 5:
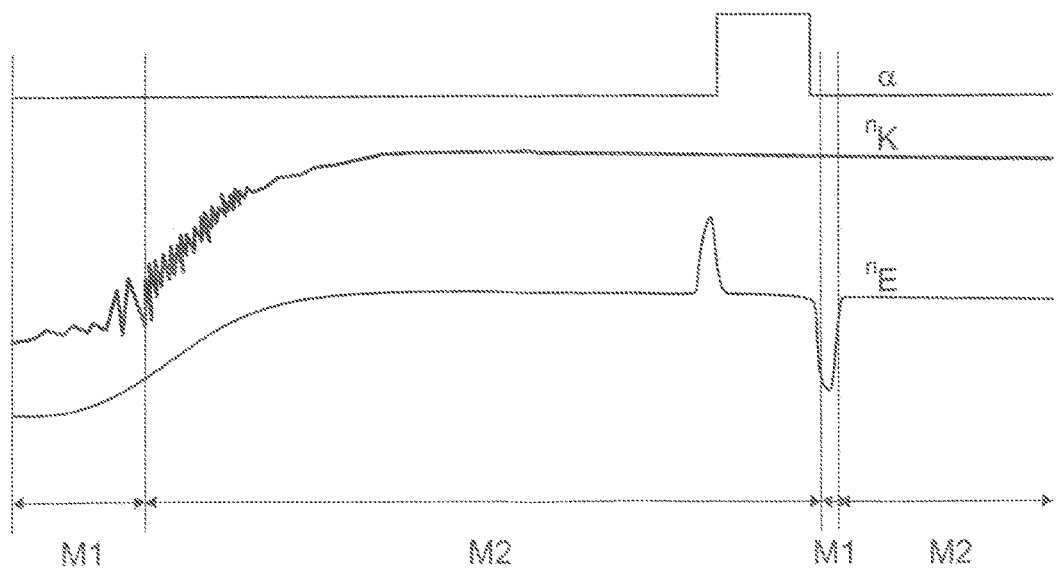
FIG. 5 shows in a further diagram a starting process for a combustion engine with the camshaft adjuster according to FIG. 5.

States of the combustion engine including the camshaft adjuster 1 during starting of the combustion engine are illustrated in FIG. 5. Before reaching the idling revolution rate, the electric motor 2 is first operated in the first actuation mode M1. With rising revolution rate, there is a change to the second actuation mode M2.

With a constant revolution rate, during further operation of the combustion engine an adjustment of the adjustment angle denoted by a of the camshaft is considered: The transition to a larger adjustment angle $\alpha$ is brought about by a brief acceleration of the rotor 8 of the electric motor 2, which can be seen in FIG. 5 as a peak. The revolution rate of the electric motor 2, i.e. of the rotor 8, is denoted in FIG. 5 by $n_E$. In order to restore the adjustment angle $\alpha$ back to the original value, a slower rotation of the rotor 8 is necessary for a short time. During said reduction of the revolution rate $n_E$ of the electric motor 2, the actuation thereof is temporarily reset to the first actuation mode M1. With the ending of the adjustment process relating to the camshaft 6, which in the example according to FIG. 5 is carried out while maintaining the revolution rate $n_K$ of the combustion engine, a further change to the second actuation mode M2 of the electric motor 2 is carried out. In the case of very low idling revolution rates, maintaining the first actuation mode M1 during idling is also possible in a way that is not shown.

In periods in which a changeover is carried out between the actuating modes M1, M2, which are also referred to as standard phases, an intermediate phase can be provided that does not arise from the simplified FIGS. 4 and 5, in which temporarily none of the actuating modes M1, M2 are used. In such an intermediate phase, for example commutation steps corresponding to a stepper motor are carried out. Because of the short duration of the intermediate phase and the resulting moments of inertia, the electric motor 2 can be operated "blind" during the intermediate phase, wherein at the same time the operating state thereof, including the angular position of the rotor 8, can be assumed to be known with good accuracy.

Regardless of whether an intermediate phase exists during the transition between the actuating modes M1, M2, there can be a hysteresis with changeover processes carried out successively in different directions. Unnecessarily frequent changeover processes can be avoided in this way. In this respect, the areas marked in FIG. 4 by M1 and M2 are not invariable. Rather for example, the area characterized by M1 during operation of the electric motor 2, in which the motor is started with the first actuation mode M1 and in the further course the motor is changed to the second actuation mode M2, is larger than in cases in which the electric motor 2 is already running in the second actuation mode M2 and is reset to the first actuation mode M1—in the course of reducing the revolution rate of the engine and/or adjusting the camshaft. In particular, in the latter case, i.e. in the event of a change from the second actuation mode M2 to the first actuation mode M1, the direction of rotation of the rotor 8 is reversible during an adjustment process. The reversed direction of rotation means in the case of a positive adjusting gear 11 that the direction of rotation of the rotor 8 is opposite to the direction of rotation of the camshaft.

LIST OF REFERENCE CHARACTERS 1 camshaft adjuster
2 electric motor
3 driven shaft
4 drive shaft
5 shaft
6 adjusting shaft
7 drive wheel
8 rotor
9 stator
10 housing
11 transmission
12 actuating unit
13 mounting plate
14 traction means
15 drive shaft
16 sensor wheel
17 Sensor
18 sensor wheel
19 Sensor
20 signal line
21 signal line
22 microcontroller
23 voltage sensor
24 current sensor
25 driver
26 line
27 power electronics circuit

The invention claimed is:

1. An adjusting unit configured for an internal combustion engine, the adjusting unit comprising:
an electric motor;
a transmission that interacts with the electric motor;
an adjusting shaft coupled to a rotor of the electric motor;
an output shaft configured for coupling to a shaft of the internal combustion engine; and,
a sensorless actuating unit for actuation of the electric motor, the sensorless actuating unit configured to carry out at least two different operating modes in different revolution rate ranges of the electric motor including:
a pulse-based mode in a lower revolution rate range; and,
a counter voltage-based mode in an upper revolution rate range, and,
wherein an operating mode of the electric motor is configured to change from the counter voltage-based mode to the pulse-based mode during rotation of the rotor.

2. The adjusting unit as claimed in claim 1, wherein the shaft of the internal combustion engine is embodied as a camshaft and the adjusting unit is embodied as a camshaft adjuster.

3. The adjusting unit as claimed in claim 1, wherein the adjusting unit is embodied as a device for varying a compression ratio.

4. The adjusting unit as claimed in claim 1, wherein the sensorless actuating unit is coupled to sensors that are embodied to detect a revolution rate of the shaft and of a shaft driving the shaft.

5. The adjusting unit as claimed in claim 1, wherein the sensorless actuating unit is disposed outside a housing of the electric motor enclosing a stator of the electric motor.

6. The adjusting unit as claimed in claim 1, wherein the electric motor is embodied as a three-phase electronically commutated motor.

7. The adjusting unit as claimed in claim 1, wherein a harmonic drive transmission, with a drive shaft that is fixed relative to a housing of the electric motor, is provided as the transmission.

8. The adjusting unit as claimed in claim 1, wherein a housing of the transmission includes a drive wheel is configured to be connected to a belt drive or chain drive of the internal combustion engine.

9. The adjusting unit as claimed in claim 1, wherein the sensorless actuating unit is mechanically connected to the electric motor by a mounting plate.

10. A method for operating an adjusting unit provided for adjustment of a shaft of an internal combustion engine, which comprises a sensorless electronically commutating electric motor and a transmission operated by the electric motor, the method comprising:
detecting an angular position of a rotor based on current pulses, defining a first mode; and,
changing the commutation of the electric motor to a counter voltage-based mode, defining a second mode, and,
changing the communication of the electric motor from the second mode to the first mode during rotation of the rotor.

11. The method as claimed in claim 10, wherein signals of sensors that detect angle information of a crankshaft and a camshaft outside the electric motor are used for actuation of the electric motor.

12. The method as claimed in claim 10, wherein the first mode is utilized from a standstill of the electric motor up to a revolution rate limit of the electric motor, and the second mode is utilized at revolution rates of the electric motor greater than the revolution rate limit.

13. The method as claimed in claim 10, wherein a transition from the first mode to the second mode occurs when a rate of change of revolution rate of a crankshaft of an internal combustion exceeds a limit.

14. The method as claimed in claim 10, wherein a transition from the first mode to the second mode occurs when a revolution rate of the electric motor resides between 3% and 20% of a rated revolution rate of the electric motor.

15. An adjusting unit configured for an internal combustion engine, the adjusting unit comprising:
an electric motor;
a transmission that interacts with the electric motor;
an adjusting shaft coupled to a rotor of the electric motor;
an output shaft configured for coupling to a shaft of the internal combustion engine; and,
a sensorless actuating unit for actuation of the electric motor, the sensorless actuating unit configured to carry out at least two different operating modes of the electric motor including;
a first pulse-based mode; and,
a second counter voltage-based mode; and,
wherein an operating mode of the electric motor is configured to change from the counter voltage-based mode to the pulse-based mode during rotation of the rotor.

16. The adjusting unit as claimed in claim 15, wherein the first pulse-based mode is utilized from a standstill of the electric motor up to a revolution rate limit of the electric motor, and the second counter voltage-based mode is utilized at revolution rates of the electric motor greater than the revolution rate limit.

17. The adjusting unit as claimed in claim 15, wherein a transition from the first pulse-based mode to the second counter voltage-based mode occurs when a rate of change of revolution rate of a crankshaft of an internal combustion exceeds a limit.

18. The adjusting unit as claimed in claim 15, further comprising a third intermediate actuation mode, utilized during a transition between the first pulse-based mode and the second counter voltage-based mode, the third intermediate actuation mode not using pulse-based or counter voltage-based methods.

* * * * *